United States Patent [19]
Nygren

[11] Patent Number: 6,038,736
[45] Date of Patent: Mar. 21, 2000

[54] HINGE FOR DEPLOYABLE TRUSS

[75] Inventor: William D. Nygren, Denver, Colo.

[73] Assignee: Lockheed Martin Corporation, Bethesda, Md.

[21] Appl. No.: 09/106,723

[22] Filed: Jun. 29, 1998

[51] Int. Cl.[7] .................................................. E05D 11/04
[52] U.S. Cl. ................................ 16/275; 16/386; 16/221; 52/655.1
[58] Field of Search .............................. 16/275, 276, 273, 16/386, 367, 221; 403/52, 65, 66, 71; 52/646, 655.1

[56] References Cited

U.S. PATENT DOCUMENTS

| | | |
|---|---|---|
| 1,577,234 | 3/1926 | Hubeny et al. . |
| 1,833,328 | 11/1931 | Morris ........................................ 16/276 |
| 2,672,644 | 3/1954 | Shamroth ................................... 16/275 |
| 2,982,379 | 5/1961 | Fisher ........................................ 189/19 |
| 3,579,244 | 5/1971 | Dempsey et al. ......................... 343/797 |
| 3,594,851 | 7/1971 | Swatton ..................................... 16/276 |
| 3,599,218 | 8/1971 | Williamson et al. .................... 343/840 |
| 3,618,111 | 11/1971 | Vaughn ..................................... 343/840 |
| 3,823,440 | 7/1974 | Klingelhofer ............................. 16/276 |
| 4,097,959 | 7/1978 | Johnson ..................................... 16/276 |
| 4,101,897 | 7/1978 | Morrison .................................. 343/715 |
| 4,380,013 | 4/1983 | Slysh ......................................... 343/753 |
| 4,426,821 | 1/1984 | Moore et al. .............................. 52/646 |
| 4,527,362 | 7/1985 | Tobey et al. ................................. 52/71 |
| 4,539,786 | 9/1985 | Nelson ...................................... 52/645 |
| 4,557,097 | 12/1985 | Mikulas, Jr. et al. ..................... 52/646 |
| 4,569,176 | 2/1986 | Hedgepeth et al. ....................... 52/645 |
| 4,578,920 | 4/1986 | Bush et al. ................................. 52/645 |
| 4,599,832 | 7/1986 | Benton et al. ............................. 52/118 |
| 4,814,784 | 3/1989 | Pallmeyer ................................ 343/882 |
| 4,819,399 | 4/1989 | Onoda ........................................ 52/646 |
| 4,831,807 | 5/1989 | Bolt ........................................... 52/641 |
| 4,882,884 | 11/1989 | Browne ....................................... 52/82 |
| 4,995,212 | 2/1991 | Morgan et al. ............................ 52/646 |
| 5,014,484 | 5/1991 | Tanizawa et al. ......................... 52/646 |
| 5,040,349 | 8/1991 | Onoda et al. .............................. 52/646 |
| 5,101,533 | 4/1992 | Stenger et al. ............................ 16/340 |
| 5,125,206 | 6/1992 | Motohashi et al. ....................... 52/646 |
| 5,163,262 | 11/1992 | Adams ...................................... 52/646 |
| 5,228,258 | 7/1993 | Onoda et al. .............................. 52/646 |
| 5,363,627 | 11/1994 | Wilson ...................................... 52/641 |
| 5,406,767 | 4/1995 | Pech et al. ................................. 52/638 |
| 5,553,961 | 9/1996 | Olden ...................................... 403/119 |
| 5,603,595 | 2/1997 | Nygren, Jr. ............................... 411/366 |
| 5,695,306 | 12/1997 | Nygren, Jr. ............................... 411/433 |

FOREIGN PATENT DOCUMENTS

| | | | |
|---|---|---|---|
| 186203 | 4/1982 | Japan . | |
| 371361 | 9/1963 | Switzerland ............................. 16/276 |
| 2047327 | 11/1980 | United Kingdom ..................... 16/273 |

*Primary Examiner*—Chuck Y. Mah
*Attorney, Agent, or Firm*—Holme Roberts & Owen, LLP

[57] ABSTRACT

An improved hinge assembly is disclosed that is particularly apt for use with deployable trusses utilized on satellites and other spacecraft. In one arrangement, the inventive hinge assembly comprises a tapered roller bearing assembly having tapered rollers angled towards a hinge axis, and a needle roller thrust bearing assembly positioned radially about at least a portion of the tapered roller bearing assembly to yield a compact and lightweight bearing arrangement, while providing satisfactory radial and axial loading bearing characteristics. An axial preload assembly may also be employed with the roller bearing assemblies in the invention to yield enhanced hinge stiffness and repeatability benefits. Such characteristics are of particular importance with deployable spacecraft truss assemblies for supporting instrumentation during orbit. An additional needle roller bearing assembly may be included at an axially spaced position from the tapered roller bearing assembly to provide overload protection (e.g., for ground-based handling and on-orbit acceleration/deceleration), and thereby allowing for a reduction in the size/weight of the primary tapered roller and needle roller thrust bearing assemblies.

34 Claims, 8 Drawing Sheets

FIG.5

HINGE FOR DEPLOYABLE TRUSS

FIELD OF THE INVENTION

The present invention relates to hinge assemblies, and more particularly, to a hinge assembly that is particularly apt for use with deployable trusses utilized on satellites and other spacecraft.

BACKGROUND OF THE INVENTION

Extraterrestrial vehicles are increasingly being employed to position satellites in space after exit from the earth's atmosphere. Once positioned, the satellites will frequently deploy instrumentation. Such instrumentation may include a wide variety of componentry, including for example, communications equipment, solar array panels and imaging modules. In many applications, the deployed instrumentation is stored within a selectively openable bay of the satellite during travel from the earth, and deployed into a predetermined position relative to the satellite after positioning in space. For instrumentation deployment and support purposes, truss and hinge assemblies are frequently employed.

In this regard, while truss structures may be at least partially constructed manually in space, the benefits of having a truss structure preassembled for selective, automatic deployment utilizing hinge assemblies are readily recognizable. In such arrangements, it is important for the hinge assemblies and deployable trusses to not only provide the necessary support and stiffness for accurate, reliable and repeatable positioning of the instrumentation mounted thereupon, but additionally for such devices to be stowable in a compact manner. In this regard, it should be appreciated that not only the width and length of a collapsed truss is important, but additionally the depth of such collapsed truss and interfacing hinge assembly.

SUMMARY OF THE INVENTION

In view of the foregoing, one objective of the present invention is to provide a truss that is deployable from a compact, stowed position to a deployed position, and that is particularly apt for use on satellites and the like. More particularly, it is an object of the present invention to provide a foldable truss that provides for improved compactness in its depth profile when in the stowed position, and which provides design flexibility for maintaining satisfactory width and length requirements while in the stowed position.

Another objective of the present invention is to provide a hinge that provides for accurate, reliable and repeatable positioning of interconnected structural members, and that is particularly apt for use in conjunction with foldable trusses utilized on satellites and other spacecraft.

Yet another objective of the present invention is to provide truss and hinge assemblies that address the above-noted objectives while also being lightweight and robust enough for ground handling.

One or more of the above-noted objectives and additional advantages are provided in a truss assembly which comprises at least three interconnected truss member sets that are each deployable from a stowed, or folded, position to a deployed position. In this regard, each of the truss member sets comprises at least a first truss member that it pivotably interconnected to a second truss member, wherein the truss member sets combinatively define a polygonal structure having a center axis in the deployed position. At least one of the truss member sets includes first and second truss members that are pivotably interconnected to fold inwardly relative to the center axis in the stowed position. At least another of the truss member sets includes first and second truss members that are pivotably interconnected to fold outwardly relative to the center axis in the stowed position.

In one aspect, the inventive truss assembly further comprises an inboard support frame and an outboard support frame. The inboard support frame is pivotably interconnected to an end of each of the first truss members of each of the truss member sets. Similarly, the outboard support frame is pivotably interconnected to an end of each of the second truss members of each of the truss member sets. The inboard support frame may be mounted to a support surface (e.g., within a bay of a spacecraft), while the outboard support may support instrumentation and/or another truss assembly mounted thereupon.

The truss member sets may be provided so that the inboard and outboard support frames lie in parallel planes in both the stowed and deployed positions. The truss member sets may be further provided so that the orientation of the outboard support frame relative to the inboard support frame is maintained as the truss assembly moves from the stowed position to the deployed position. By way of primary example, the outboard support frame may be advantageously disposed to move orthogonally away from the inbound support frame during deployment.

In one arrangement, the above-noted polygonal structure defined by the interconnected truss member sets is three-sided. Correspondingly, each of the inboard support and outboard support frames may comprise three truss members that are rigidly interconnected, wherein the inboard support frame and outboard support frame are commonly configured and commonly oriented relative to the center axis of the truss assembly in both the stowed position and deployed position.

In another aspect of the inventive truss assembly, each of the truss member sets are provided so that they are foldable for positioning in non-overlapping relation when the truss is in the stowed position. In this regard, it is preferable for one of the truss member sets to comprise first and second members that are pivotably interconnected to fold inwardly relative to the center axis in the stowed position, and for two of the truss member sets to each comprise first and second members that are pivotably interconnected to fold outwardly relative to the center axis in the stowed position.

In one arrangement, each of the truss member sets comprise v-shaped first and second structural members that are pivotably interconnected at their respective apices. Separate corner truss member sets are also provided in corresponding relation to the number of sides of the polygonal structure comprising the truss assembly. More particularly, each corner truss member set serves to define a long, functionally extending corner or edge of the polygonal structure when the truss assembly is deployed. For folding purposes, each such corner set comprises at least two pivotably connected, elongate truss members, wherein such truss members extend between and are pivotably connected to opposing corners of inboard and outboard support frames. To further enhance support, one of the first and second v-shaped structural members of each truss member set is interconnected at its apex to an adjacent truss member of a corner truss member set.

Additional ones of the above-noted objectives and other attendant advantages are also provided by an inventive hinge assembly for allowing pivotal movement, about a hinge axis, of a first structural member relative to a second structural member. By way of primary example, such hingedly connected first and second structural members may correspond with a truss member of a truss member set and an inboard or outboard support frame as described above. The hinge assembly comprises at least a first bearing means and a second bearing means which are each interposed between the first and second structural members (e.g., comprising a truss assembly). The first bearing means includes an annular bearing surface that extends in a first direction. The second bearing means includes an annular bearing surface that extends in a second direction, such second direction being transverse to the first direction. Such transverse orientation between bearing surfaces of the first and second bearing means yields a hinge assembly that is capable of providing highly accurate positioning of instrumentation mounted on one of the first and second structural members (e.g., on a cantilevered end). More particularly, the inventive hinge assembly is capable of accommodating both axial and radial loads while maintaining accurate positioning of deployable instrumentation relative to a spacecraft.

In one aspect of the inventive hinge assembly, the annular bearing surface of the first bearing means extends longitudinally relative to the hinge axis, and is preferably of a frusto-conical configuration. The first bearing means may advantageously comprise a tapered roller bearing assembly that includes a plurality of arcuately positioned tapered rollers having outer surfaces angled toward the hinge axis in the first direction. As will be appreciated, utilization of such an arrangement provides a line contact bearing design capable of carrying heavy radial and thrust loads, such as those encountered in a cantilevered spacecraft truss.

In a related aspect of the inventive hinge assembly, the annular bearing surface of the second bearing means lies in a plane transverse to the hinge axis, and most preferably in a plane that is orthogonal to the hinge axis. In this regard, the second bearing means may comprise a needle roller thrust bearing assembly. The provision of such a bearing is effective for handling heavy axial loads and also yields safe space-saving benefits. In this regard, and as with the use of tapered roller bearings, line contact is provided.

In one arrangement, a hinge assembly is provided that comprises an annular tapered roller bearing assembly and an annular needle roller thrust bearing assembly that is at least partially positioned about, and outwardly from, the tapered roller bearing assembly. In this regard, the annular needle roller thrust bearing assembly may be advantageously press fit about a portion of an annular outer race member comprising the tapered roller bearing assembly, thereby yielding space-savings and a "tight" hinge. Further, a preload assembly may be included for applying a preload against an inner race member comprising the tapered roller bearing assembly so as to yield an axially "tight" hinge. As will be appreciated, the provision of "tight" hinge interconnections (i.e., with little or no slop) is of particular benefit in truss applications for equipment deployment on spacecraft.

In the above-noted arrangement, an additional secondary bearing may also be utilized that is spaced axially from the tapered roller bearing assembly and that extends about and along the hinge axis of the hinge assembly. Such secondary bearing may comprise a needle roller bearing assembly or busing having bearing surfaces oriented parallel to the hinge axis. The provision of a secondary bearing provides overload, or torquing, protection, and is therefore of particular benefit for ground-based handling and for rapid on-orbit acceleration/deceleration movements.

Numerous additional arrangements and corresponding benefits will become apparent to those skilled in the art upon further consideration and review of the detailed description that follows.

DETAILED DESCRIPTION

Figure 1A:
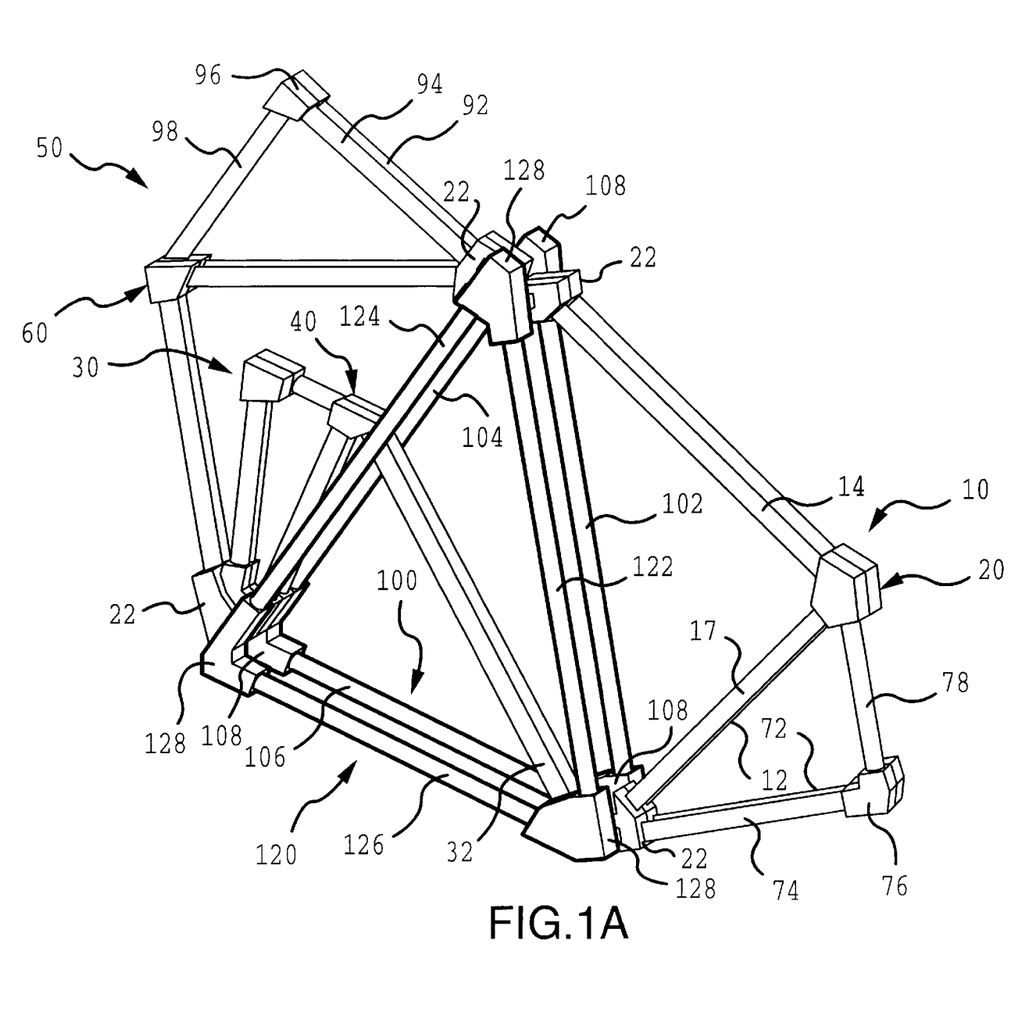
FIGS. 1A–1C illustrate one embodiment of a truss assembly comprising the present invention in folded, partially-deployed and fully deployed positions.
Figure 1B:
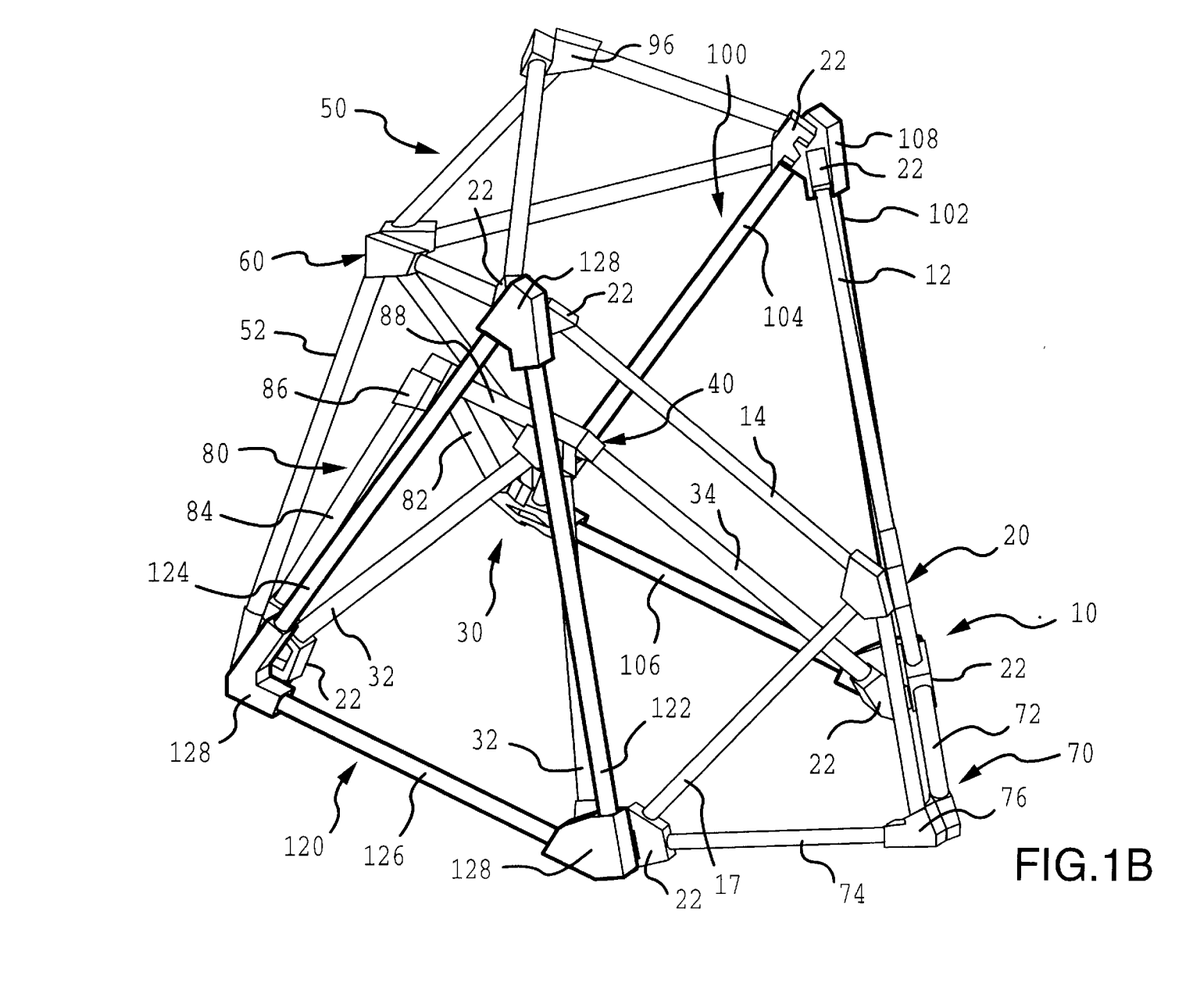
Figure 1C:
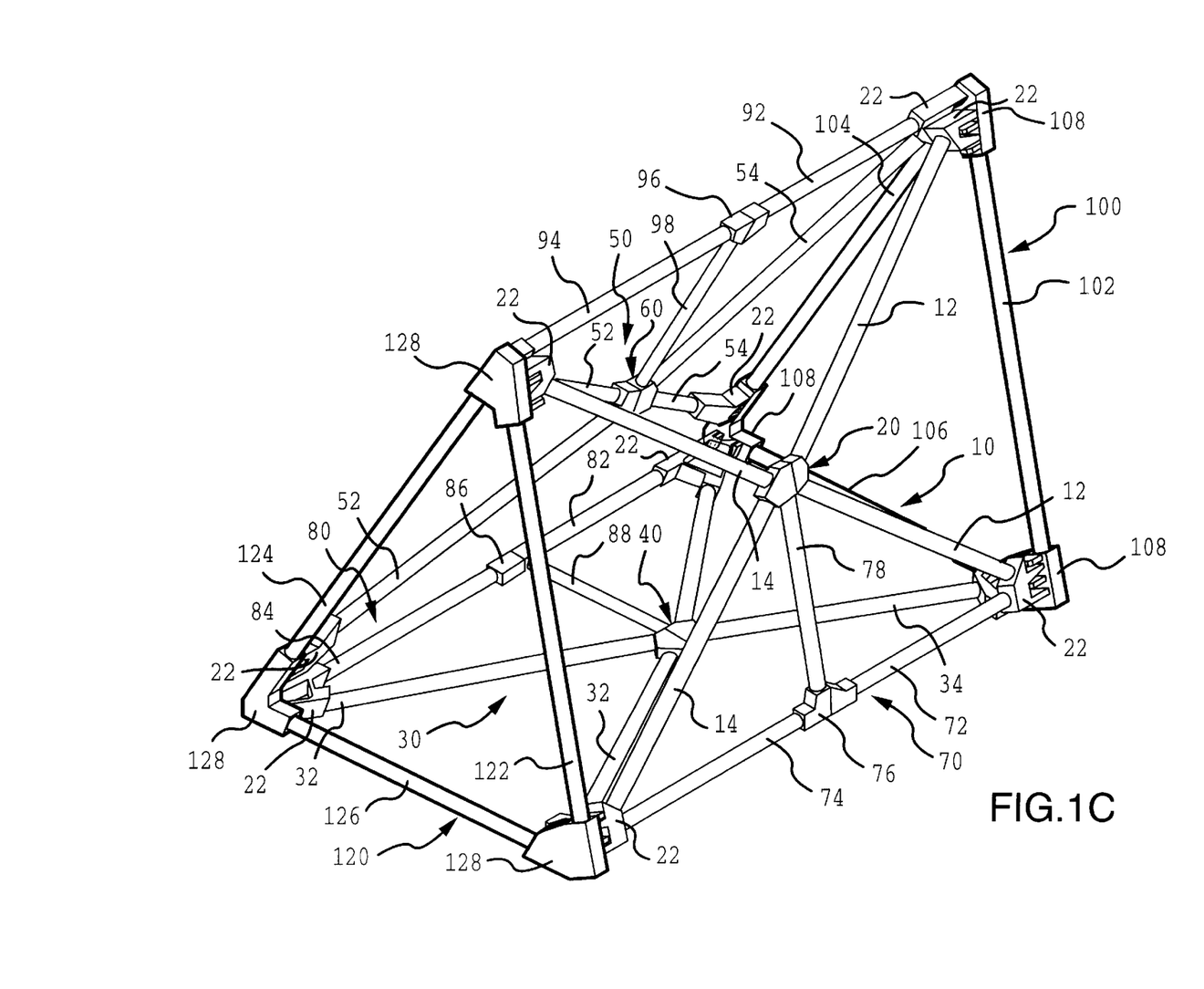

The truss assembly embodiment illustrated in FIGS. 1A–1C and FIG. 2 comprises three interconnected truss member sets 10, 30 and 50, each of said truss member sets 10, 30 and 50 at least partially defining one side of a triangular or three-sided support structure when the embodiment is in a deployed position as per FIG. 1C. As illustrated, each of the truss member sets 10, 30 and 50 comprise, opposing v-shaped first and second truss members 12 and 14, 32 and 34, and 52 and 54, respectively, which are pivotably interconnected at their apices via hinges 20, 40 and 60, respectively. Of note, hinges 20 and 60 provide for outward folding while hinge 40 provides for inward folding. Further, the truss member sets 10, 30 and 50 are identically sized and configured, wherein hinges 20, 40 and 60 are disposed within a common layer when stowed (see FIG. 1A), during deployment (see FIG. 1B) and when fully deployed (see FIG. 1C).

The illustrated truss assembly further comprises three side-corner truss assemblies 70, 80 and 90 which define longitudinally extending corner edges of the three-sided support structure when the truss assembly is in its deployed position. Each of the side-corner assemblies 70, 80 and 90 comprise first and second elongated members 72 and 74, 82 and 84, and 92 and 94, respectively, which are pivotably interconnected by hinges 76, 86 and 96, respectively. The side corner assemblers 70, 80 and 90 are identically sized and configured, wherein hinges 76, 86 and 96 are disposed within a common layer, together with hinges 20, 40 and 60 when stowed, during deployment and when deployed. Sidebar support members 78, 88 and 98 are also provided and are rigidly interconnected at one end to side corner assemblies 70, 80, 90, via hinges 20, 40 and 60, respectively. Such side-bar members 78, 88 and 98 are also rigidly interconnected at a second end to truss member sets 10, 30 and 50, via hinges 20, 40 and 60, respectively.

The truss embodiment of FIGS. 1A–1C and 2 further includes an inboard support frame 100 and an outboard support frame 120, each of which have the same triangular configuration. In this regard, each of the inboard and outboard support frames 100 and 120 comprise three end-support truss members 102, 104 and 106, and 122, 124 and 126, respectively, which are rigidly interconnected via corner connections 108 and 128, respectively. Further, the inboard and outboard support frames 100 and 120 are pivotably interconnected to first truss members 12,32 and 52, second truss members 14,34 and 54, first elongated members 72, 82 and 92, and second elongated members 74, 84 and 94 via hinges 22, embodiments of which will be further described.

As noted, the described components collectively define a three-sided configuration when the truss assembly is in a deployed position, such triangular configuration having a center axis passing therethrough. While a three-sided configuration is illustrated and described, it will be appreciated that other configurations may be possible while employing various aspects of the present invention.

Figure 2:
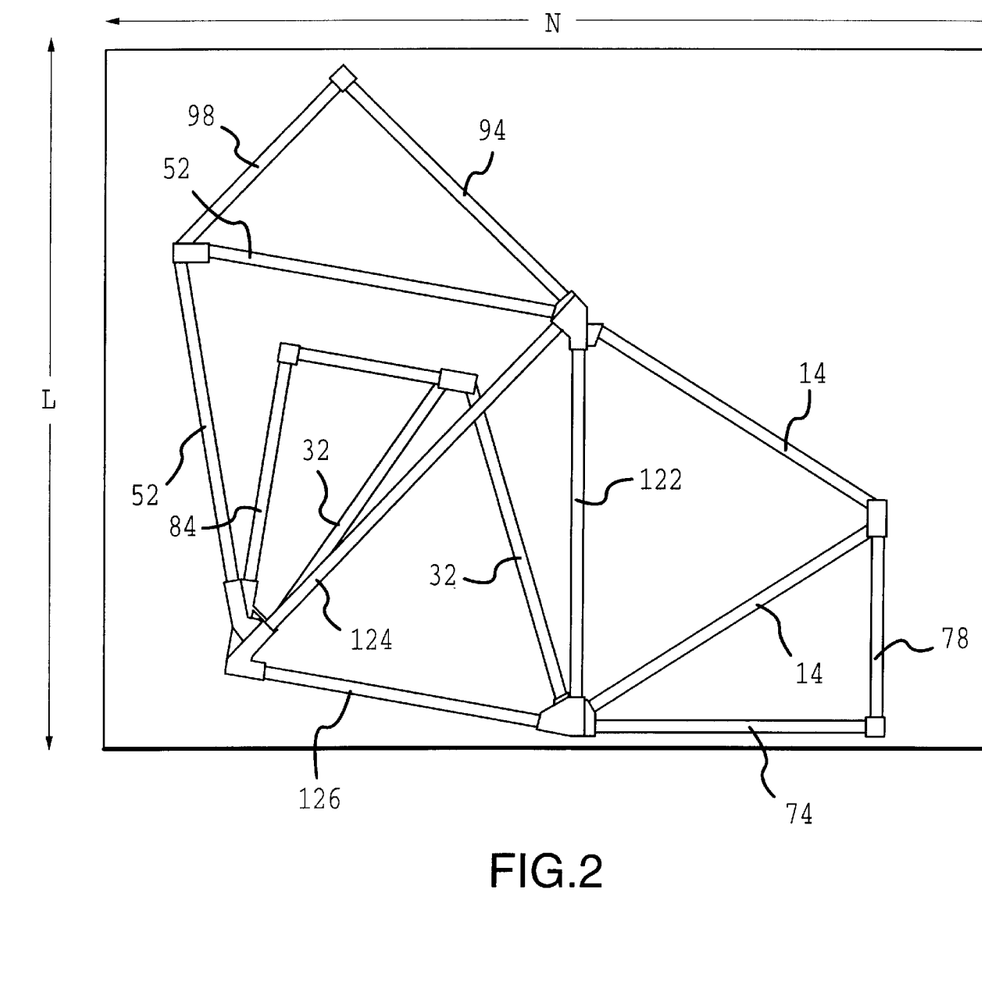
FIG. 2 illustrates an end view of the truss assembly embodiment of FIGS. 1A–1C while in the folded, or stowed position of FIG. 1A.

With particular reference to FIG. 2, it can be seen that the truss member sets 10, 30 and 50 are disposed in nonoverlapping relation when the truss assembly is in a folded, or stowed position. That is, the first and second truss members 12 and 14, 32 and 34, and 52 and 54, are all positioned in substantially laterally spaced relation so as to enhance compact stowability from a depth profile standpoint. Further, it can be seen that the truss assembly in its folded position can efficiently fit within a stowage compartment having dimensions L×N, (e.g., equipment such as the bay of a satellite), yet have ample room for equipment mounted or mountable thereupon.

Returning now to FIGS. 1A–1C, it can be seen that the outboard support frame 120 is positioned directly over the inboard support frame 100 in the folded position, and that the outboard support frame 120 moves orthogonally away from the inboard support frame 100 as the truss assembly is deployed. For space applications, such orthogonal movement facilitates the mounting and ready deployment of instrumentation on the outboard support frame 120 as well as the interconnection of additional truss assemblies having a similar or identical configuration to that described hereinabove. With respect to interconnected instrumentation, it will be appreciated that such instrumentation may comprise solar array panels, imaging modules, or a variety of other equipment. Such instrumentation may be mounted either outwardly of the outboard support frame 120 or sidewardly from one or more of the outboard support frame members 122, 124 or 126.

Figure 3A:
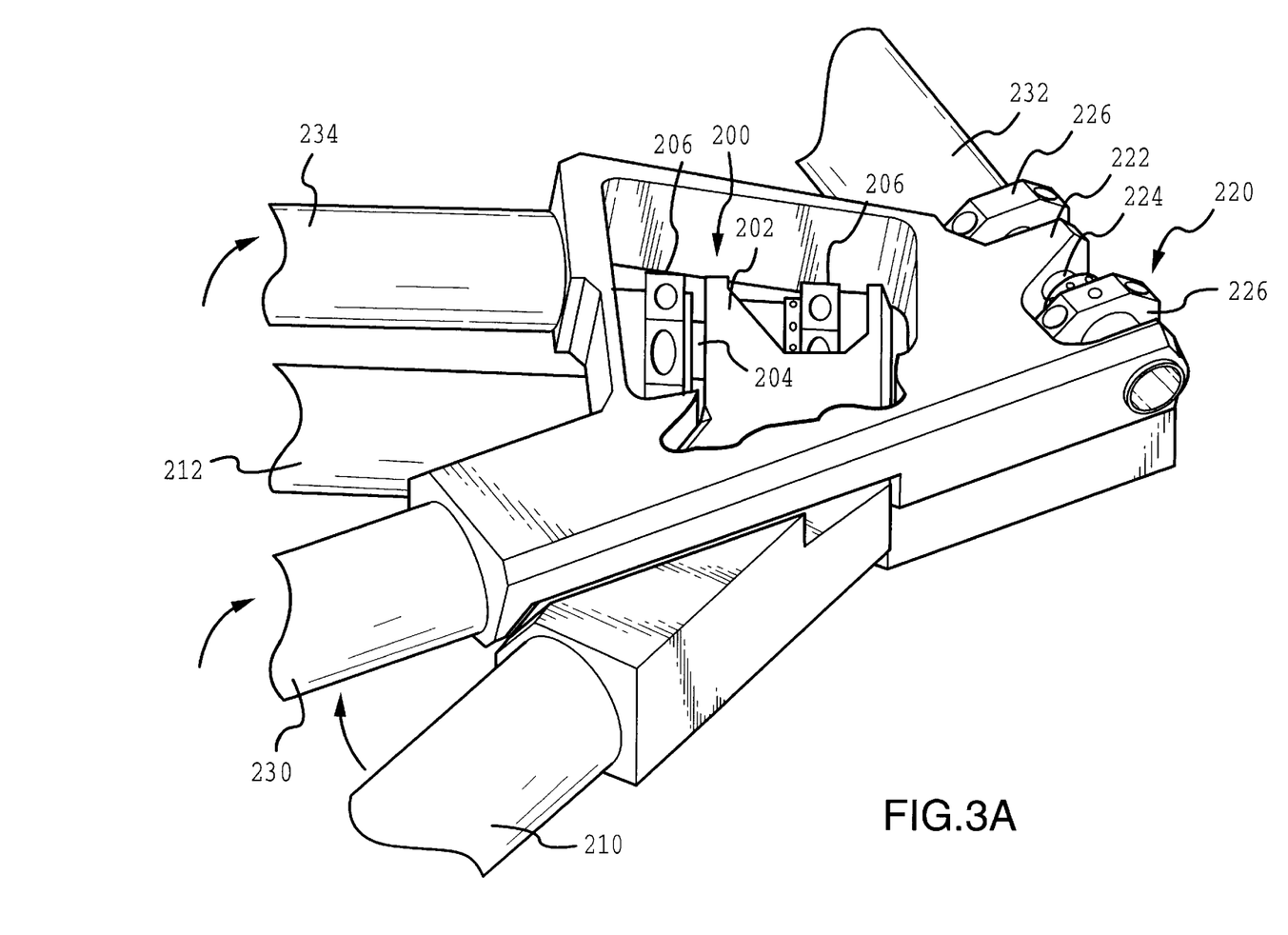
FIGS. 3A–3B illustrate perspective views of hinge embodiments comprising the present invention.
Figure 3B:
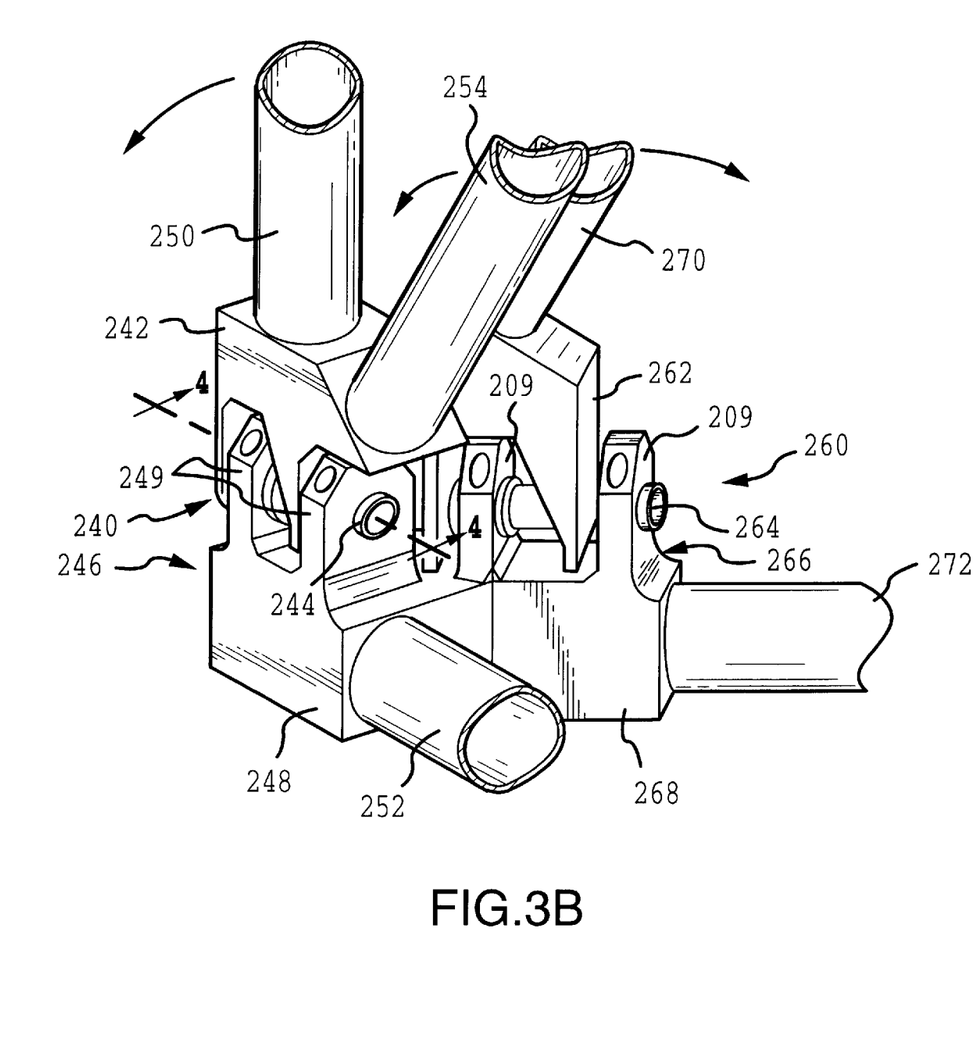

Reference will now be made to FIGS. 3A and 3B, which illustrate hinge assembly embodiments comprising the present invention. Of particular interest, such assemblies may be employed in conjunction with the truss assembly embodiment described above. With respect to FIG. 3A, hinge assemblies 200 and 220 provide for repeatable and reliable pivotal movement of the structural members interconnected thereto.

More particularly, hinge assembly 200 provides for pivotal movement of structural member 210 relative to structural members 212 and 232. Similarly, hinge assembly 220 provides for pivotal movement of structural members 230 and 234 relative to structural members 232 and 212. As will be appreciated, hinge assemblies 200 and 220 may be readily implemented for use in corresponding relation to one or more of the hinges 22 of the truss assembly illustrated in FIGS. 1A–1C. In such an implementation, structural members 230, 234 and 210, and structural members 212 and 232, would correspond with components of the truss member sets 10, 30 and 50 and components of the inboard/outboard support frames 110 and 120, respectively.

Each of the hinge assemblies 200 and 220 comprises a yoke member 202 and 222, respectively, rigidly interconnected to structural member 210, and structural members 230 and 234, respectively. As illustrated in FIG. 3A, opposing portions of yoke members 202 and 222 may be "notched" to define opposing recesses, wherein yoke members 202 and 222 are partially nested when in a folded, or stowed, position (e.g., thereby reducing the overall depth profile). Yoke members 202 and 222 each include a unshaped portion having aligned openings for receiving an axle member 204 and 224, respectively, therethrough. As will be further described, the aligned openings may be provided with corresponding bearing assemblies therein/thereabout to accommodate and support repeatable and reliable pivotal movements at interconnected structural members about the hinge axes defined by axle members 204 and 224. Further in this regard, axles 204 and 224 are supportably and securely mounted to corresponding cradle members 206 and 226, respectively.

FIG. 3B illustrates an alternative arrangement to that shown in FIG. 3A, and comprises hinge assemblies 240 and 260. Hinge assembly 240 provides for pivotal movement of structural members 250 and 254 relative to structural members 252 and 272. Hinge assembly 260 provides for pivotable movement of structural member 270 structural members 252 and 272. As will be appreciated, hinge assemblies 240 and 260 may also be readily implemented for use in corresponding relation to one or more of the hinges 22 of the truss assembly illustrated in FIGS. 1A–1C. In such an implementation, structural members 250, 254 and 270, and structural members 252 and 272 would correspond with components of the truss member sets 10, 30 and 50 and components of the inboard/outboard support frames 110 and 120, respectively. Further, it is noted that, hinge assemblies 240 and 260 may be employed in conjunction with hinge assemblies 200 and 220 in such an implementation.

Each of the hinge assemblies 240 and 260 comprises a yoke member 242 and 262, respectively, rigidly interconnected to structural members 250 and 254, and to structural member 270, respectively. Yoke members 242 and 262 each include a unshaped portion having aligned openings for receiving an axle member 244 and 264, respectively, therethrough. As will be further described, the aligned openings may be provided with corresponding bearing assemblies therein/thereabout to accommodate and support repeatable and reliable pivotal movements of interconnected structural members about the hinge axes defined by axle members 244 and 264. Further in this regard, axles 242 and 262 are supportably and securely mounted to corresponding cradle members 246 and 266, respectively. Each of the cradle members 246 and 266 may comprise a base portion 248 and 268, and upper cap members 249 and 269, respectively, wherein the cap members 249 and 269 may be selectively secured to the base portions 248 and 268, respectively (e.g., via a threaded bolt positioned through and nested into recesses provided in cap members 249 and 269).

Figure 4:
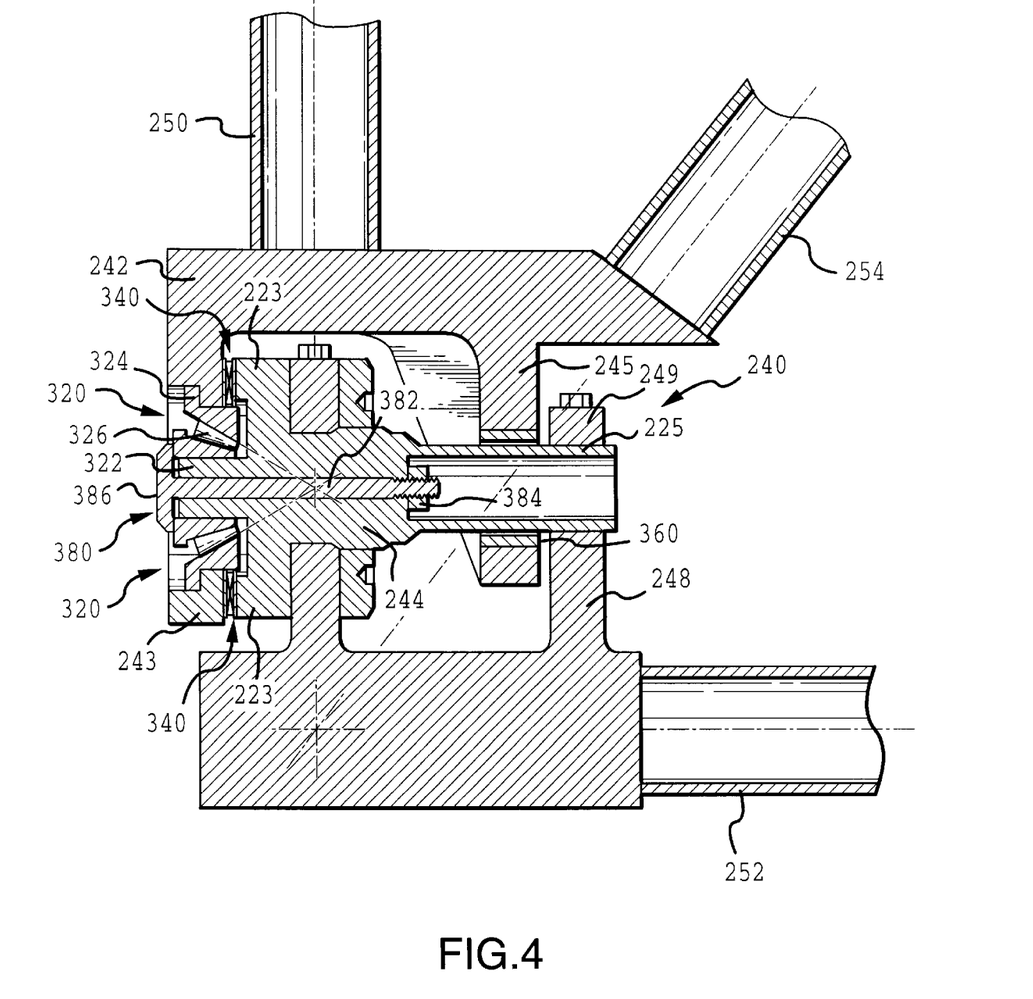
FIG. 4 illustrates a side, cross-sectional view of an embodiment of a hinge assembly comprising the present invention.

FIG. 4 illustrates a cross-sectional view of the hinge assembly 240 shown in FIG. 3B and will be utilized to further describe various analogous features of hinge assemblies 200, 220, 240 and 260, including in particular, bearing assemblies that may be utilized therein. In the exemplary hinge assembly 240 illustrated in FIG. 4, three different bearing assemblies are provided. As illustrated in FIG. 4, an annular tapered roller bearing assembly 320 is disposed about one end of axle member 244 and within an opening through a first extension portion 243 of yoke member 242. Bearing assembly 320 comprises an annular inner race member 322, an outer annular race member 324, and a plurality of arcuately disposed tapered rollers 326 therebetween. The outer race member 324 includes an L-shaped annular flange that fits within and abuts against an opposing L-shaped annular flange of first extension portion 243 of the yoke member 242. The inner race member 322 abuts against an annular outer surface of the axle member 244.

The tapered roller bearing assembly 320 comprises bearing surfaces that are oriented at acute angles relative to the hinge axis (as defined by the center axis of the axle member 244). More particularly, the bearing surfaces of the tapered rollers 326 are tapered towards the hinge axis wherein the center axes for the tapered rollers intersect at a first location along the hinge axis. In this regard, the first location may lie within a plane that also includes a second location at which center axes for structural members 250, 252 and 254 intersect, as shown in FIG. 4.

Positioned about at least a portion of tapered roller bearing assembly 320 is an annular needle thrust bearing assembly 340. More particularly, needle thrust bearing assembly 340 is positioned around and clearance fit about (i.e., to have a slightly positive clearance) the outer race member 324 of the tapered roller bearing assembly 320 and is engageable between an annular surface of the first extension portion 243 of yoke member 242 and an opposing, annular, radially extending portion 223 of axle member 244. The needle thrust bearing assembly comprises bearing surfaces that are oriented substantially orthogonal to the hinge axis of hinge assembly 240. In this regard, it is noted that the bearing assemblies 320 and 340 each provide for rolling line contact, and collectively yield enhanced radial and axial load-bearing characteristics, with virtually no "slop," in a relatively simple, light weight and compact arrangement.

As shown in FIG. 4, hinge assembly 240 further includes a needle roller bearing assembly 360 positioned within an opening through a second extension portion 245 of yoke member 242 and about a longitudinally extending portion 225 of axle member 224. More particularly, the bearing surfaces of the needle roller bearing assembly 360 are oriented substantially parallel to the hinge axis of hinge assembly 240 and the opposing outer surface of the longitudinally extending portion 225 of axle member 224. As illustrated, the bearing assembly 360 is spaced axially from both of the bearing assemblies 320 and 340 and is provided with a slight clearance relative to the outer surface of portion 225 of axle member 224 when the hinge axis coincides with the center axis for each of the bearing assemblies 320, 340 and 360. As will be appreciated, a primary purpose for the bearing assembly 360 is to provide overload support capabilities, including in particular, load-carrying during ground-based handling or upon orbital acceleration/deceleration. In short, the bearing assembly 360 serves to reduce overstressing of the bearing assemblies 320 and 340. As will be appreciated, a simple bushing arrangement may also be utilized in place of the roller bearing assembly 360 for the noted purposes.

For purposes of providing a preload to bearing assembly 320, a preload assembly 380 is provided that comprises a threaded and elongated rod member 382 positioned on the hinge center axis and tightening nut 384. As illustrated, the head 386 of rod member 382 is disposed to bear against an outer surface portion of the inner race member 322 of tapered roller bearing assembly 320. Nut 384 is provided for positioning through the end of the cylindrically configured portion 225 of axle member 224 so as to threadably engage the threaded end of rod member 382. As will be appreciated, by tightening nut 384 on rod member 382 the amount of axial preload acting upon tapered roller bearing assembly 320 may be selectively adjusted to provide a relatively "stiff" hinge having a relatively constant preload that is capable of accurate, repeatable and reliable positioning of structural truss members and equipment mounted thereto. In this regard, it should be further noted that the utilization of a relatively long and skinny rod member 382 yields a compliable preload arrangement (e.g., for handling thermal wear/expansion without corresponding variations in the amount of preload force applied).

The embodiments described above can be implemented in a lightweight, relatively low-cost, and yet functionally sound manner. By way of example, only hinge assemblies 200, 220, 240 and 260 may be fabricated from a metal such as titanium, while the various structural or truss members may be tubular and fabricated from metal such as aluminum or a composite material (e.g., graphite/epoxy). The bearing assemblies and axle members may comprise titanium, steel or the like.

Figure 5:
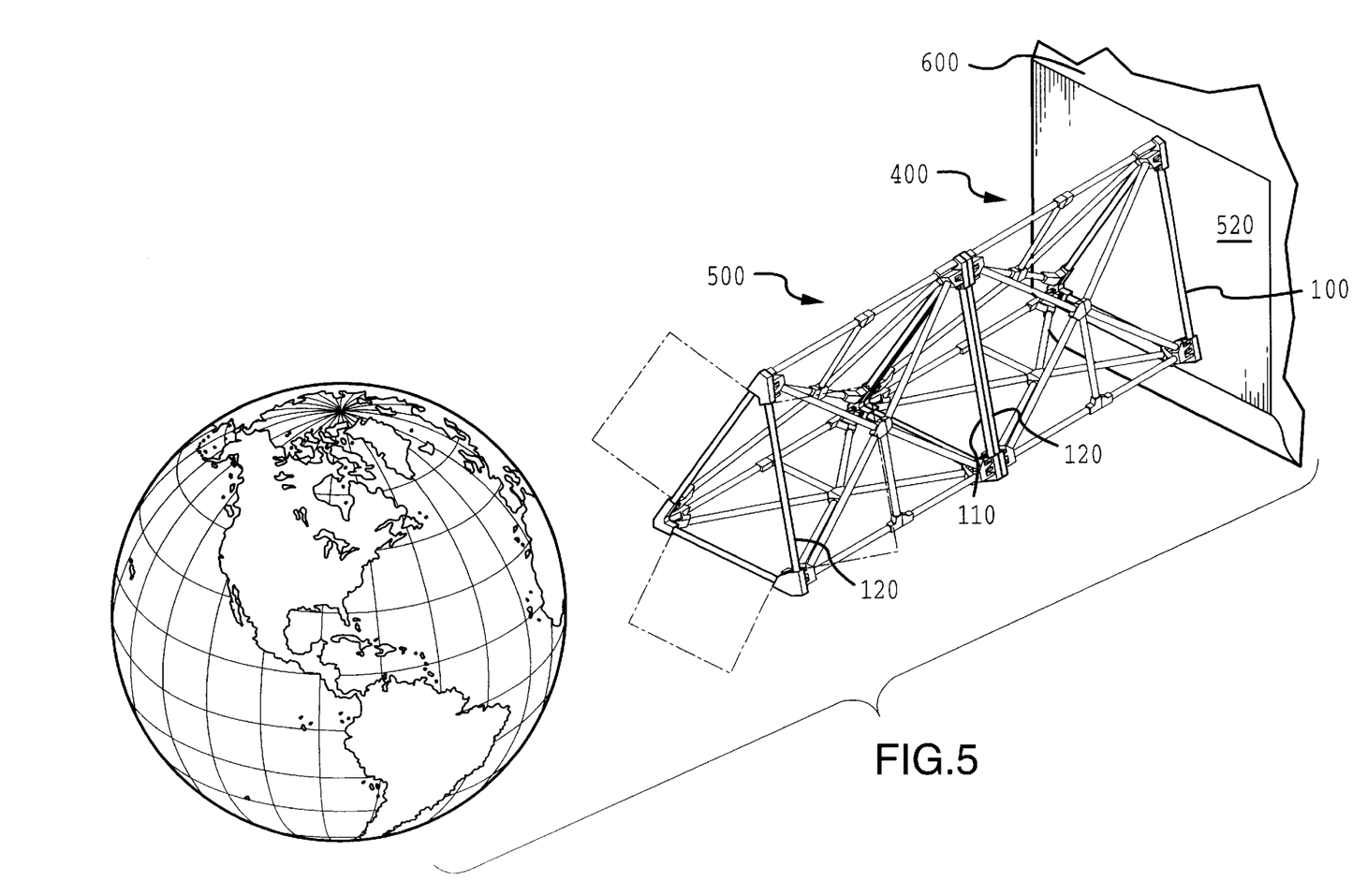
FIG. 5 illustrates a satellite embodiment comprising an end-to-end arrangement of two truss assemblies.

FIG. 5 illustrates a satellite application of various aspects of the present invention. More particularly, FIG. 5 illustrates two truss assemblies, such as those illustrated in FIGS. 1A–1C, as interconnected in an end-to-end fashion, wherein the outboard support frame 120 of a first truss assembly 400 may directly interconnected to the inboard support frame 100 of a second assembly 500. Alternatively, the outboard support frame 120 of assembly 400 may also function as the inboard support frame 100 of the second truss assembly 500. The various hinge assemblies described hereinabove may also be advantageously employed in the arrangement shown in FIG. 5 to facilitate accurate, reliable and repeatable deployment of instrumentation mounted on the truss assemblies.

In this regard, FIG. 5 includes phantom lines which may represent, by way of example, solar array panels, panels comprising antenna arrays, etc. As will be appreciated, such devices may be interconnected (e.g., hingedly) to an outer edge of the outboard support frame 120 of second truss assembly 500, as noted hereinabove.

In the arrangement illustrated in FIG. 5, the inboard support frame 100 of the first truss assembly 400 is interconnected to a surface 520 that may be within a selectively openable bay of a satellite device 600. As will be appreciated, any number of truss assemblies may be mounted in the illustrated end-to-end fashion depending on the desired wing span for positioning of the mounted instrumentation and other related factors.

The description provided above is for purposes of illustrating embodiments of the present invention. Numerous alternative arrangements and extensions will be apparent to those skilled in the art and are deemed within the scope of the present invention as set forth by the claims which follow.

What is claimed is:

1. A hinge assembly for allowing pivotable movement between a first structural member and a second structural member, comprising:

a hinge axis;

a first hinge member rigidly interconnected with said first structural member;

a second hinge member rigidly interconnected with second structural member and further movably interconnected with said first hinge member, wherein said first hinge member is pivotable relative to said second hinge member about said hinge axis;

a first bearing means interposed between said first and second hinge members and comprising an annular bearing surface disposed about a first reference axis which extends in a first direction and along which said annular bearing surface of said first bearing means at least generally extends, wherein said first bearing means is annularly disposed about said hinge axis;

a second bearing means interposed between said first and second hinge members and comprising an annular bearing surface disposed about a second reference axis which extends in a second direction and along which said annular bearing surface of said second bearing means at least generally extends, said second direction being transverse to said first direction, wherein said second bearing means is annularly disposed about said hinge axis, and wherein an entirety of said second bearing means is disposed further from said hinge axis than said first bearing means.

2. A hinge assembly as recited in claim 1, wherein said second bearing means is positioned outwardly from at least a portion of said first bearing means along a line which extends perpendicularly outwardly from said hinge axis.

3. A hinge assembly as recited in claim 1, wherein said first reference axis is disposed in a non-parallel relation to said hinge axis.

4. A hinge assembly as recited in claim 1, wherein said annular bearing surface of said first bearing means is of a frusto-conical configuration.

5. A hinge assembly as recited in claim 4, wherein said first bearing means comprises:
   a tapered roller bearing assembly, including at least one tapered roller having an outer surface angled toward said hinge axis at least generally in said first direction, wherein any of said tapered rollers comprises said annular bearing surface of said first bearing means.

6. A hinge assembly as recited in claim 5, further comprising:
   a preload assembly for applying a preload against said tapered roller bearing assembly in said first direction.

7. A hinge assembly as recited in claim 1, wherein said second reference axis associated with said second bearing means is transverse to said hinge axis.

8. A hinge assembly as recited in claim 7, wherein said second reference axis associated with said second bearing means is orthogonal to said hinge axis.

9. A hinge assembly as recited in claim 8, wherein said second bearing means comprises:
   a needle roller thrust bearing assembly.

10. A hinge assembly as recited in claim 1, further comprising:
    a third bearing means interposed between said first and second hinge members and having a cylindrical bearing surface spaced axially from said first bearing means along said hinge axis, wherein said third bearing means provides overload protection for least one of said first bearing means and said second bearing means.

11. A hinge assembly as recited in claim 10, wherein said third bearing means comprises:
    one of a needle bearing assembly and a bushing assembly.

12. A hinge assembly as recited in claim 1, wherein said first bearing means comprises a tapered roller bearing assembly comprising a plurality of tapered rollers which are each disposed about and radially spaced relative to said hinge axis at an acute angle relative thereto, and wherein said second bearing means comprises a needle roller thrust bearing assembly comprising a plurality of needle rollers which are each disposed about and radially spaced relative to said hinge axis.

13. A hinge assembly as recited in claim 12, wherein said needle roller thrust bearing assembly is positioned about at least a portion of said tapered roller bearing assembly.

14. A hinge assembly as recited in claim 13, wherein said needle roller thrust bearing assembly engages an outer race member comprising said tapered roller bearing assembly.

15. A hinge assembly as recited in claim 14, further comprising:
    an axle member mounted to one of said first structural member and said second structural member and disposed for bearing engagement with each of said tapered roller bearing assembly and said needle roller thrust bearing assembly, wherein said axle member defines said hinge axis; and
    a preload assembly for applying a preload against an inner race member comprising said tapered roller bearing assembly.

16. A hinge assembly as recited in claim 15, wherein said preload assembly comprises:
    an elongated rod for engaging said inner race member, wherein said elongated rod is positioned through a portion of said axle member on said hinge axis.

17. A hinge assembly as recited in claim 1, wherein said first bearing means comprises a plurality of said annular bearing surfaces which are defined by a plurality of rollers disposed about and radially spaced relative to said hinge axis, wherein said plurality of rollers collectively define an annular extent for said first bearing means.

18. A hinge assembly as recited in claim 7, wherein each said roller is rotatable about its own said first reference axis associated with its corresponding said annular bearing surface, and wherein said plurality of first reference axes associated with said plurality of rollers are disposed so as to collectively define a frusto-conical profile.

19. A hinge assembly as recited in claim 1, wherein said first direction is a convergence toward said hinge axis at an acute angle between said first reference axis and said hinge axis.

20. A hinge assembly as recited in claim 1, wherein said first hinge member comprises a first yoke member and said second hinge member comprises an axle member which defines said hinge axis and which is rigidly interconnected with said second structural member by a second yoke member.

21. A hinge assembly as recited in claim 1, wherein said second bearing means comprises a plurality of said annular bearing surfaces which are defined by a plurality of rollers disposed about and radially spaced relative to said hinge axis, wherein said plurality of rollers collectively define an annular extent for said second bearing means.

22. A hinge assembly as recited in claim 21, wherein each said roller is rotatable about its own said second reference axis associated with its corresponding said annular bearing surface, and wherein said plurality of second reference axes associated with said plurality of rollers are disposed within a plane which is perpendicular to said hinge axis.

23. A hinge assembly as recited in claim 1, wherein said second direction is toward said hinge axis to define a perpendicular angle between said second reference axis and said hinge axis.

24. A hinge assembly for providing pivotable movement of a first structural member relative to a second structural member about a hinge axis, comprising:
    a first yoke member rigidly interconnected to said first structural member;
    a second yoke member rigidly interconnected to said second structural member;
    an axle member mounted on and in fixed relation to said second yoke member, said axle member having a center axis coincident with said hinge axis;
    an annular tapered roller bearing assembly interposed between a first portion of said axle member and a first portion of said first yoke member; and
    a needle roller bearing assembly interposed between a second portion of said axle member and a second portion of said first yoke member, wherein said first and second portions of said axle member are different from each other and said first and second portions of said first yoke member are different from each other.

25. A hinge assembly as recited in claim 24, wherein said tapered roller bearing assembly is disposed about said axle member, and wherein said needle roller bearing assembly is positioned further from said axle member than said tapered roller bearing assembly and is further disposed about at least a portion of said tapered roller bearing assembly along a line which extends perpendicularly outwardly from said center axis of said axle member.

26. A hinge assembly as recited in claim 25, wherein said tapered roller bearing assembly comprises bearing surfaces oriented at an acute angle relative to said hinge axis, and wherein said needle bearing assembly comprises bearing surfaces oriented orthogonally to said hinge axis.

27. A hinge assembly as recited in claim 24, wherein said tapered roller bearing assembly comprises:

a plurality of tapered rollers disposed about and radially spaced relative to said hinge axis, wherein said tapered rollers each comprise a corresponding center axis, and wherein said center axes of said plurality of tapered rollers intersect at a first location on said hinge axis.

28. A hinge assembly as recited in claim 20, wherein a center axis for said first structural member and a center axis for said second structural member intersect at a second location, a plane comprising said first and second locations is orthogonal to said hinge axis.

29. A hinge assembly as recited in claim 24, further comprising:

a preload assembly for applying a preload against said tapered roller bearing assembly.

30. A hinge assembly as recited in claim 29, wherein said preload assembly comprises:

an elongated rod disposed through at least a portion of said axle member on said hinge axis; and a nut for threadably engaging one end of said elongated rod, wherein said preload may be selectively established.

31. A hinge assembly for allowing pivotable movement between a first structural member and a second structural member, comprising:

a hinge axis;

a first hinge member rigidly interconnected with said first structural member;

a second hinge member rigidly interconnected with said second structural member and further movably interconnected with said first hinge member, wherein said first hinge member pivots relative said second hinge member about said hinge axis;

a first bearing means interposed between said first and second hinge members and having an annular bearing surface extending in a first direction, wherein said annular bearing surface of said first bearing means extends longitudinally about said hinge axis, and wherein said annular, longitudinally extending bearing surface of said first bearing means is of a frusto-conical configuration;

a second bearing means interposed between said first and second hinge members and having an annular bearing surface extending in a second direction, said second direction being transverse to said first direction.

32. A hinge assembly for allowing pivotable movement between a first structural member and a second structural member, comprising:

a hinge axis;

a first hinge member rigidly interconnected with said first structural member;

a second hinge member rigidly interconnected with said second structural member and further movably interconnected with said first hinge member, wherein said first hinge member pivots relative said second hinge member about said hinge axis;

a first bearing means interposed between said first and second hinge members and having an annular bearing surface extending in a first direction;

a second bearing means interposed between said first and second hinge members and having an annular bearing surface extending in a second direction, said second direction being transverse to said first direction, wherein said annular bearing surface of said second bearing means lies in a plane transverse to said hinge axis, wherein said plane is orthogonal to said hinge axis, and wherein said second bearing means comprises a needle roller thrust bearing assembly.

33. A hinge assembly for allowing pivotable movement between a first structural member and a second structural member, comprising:

a hinge axis;

a first hinge member rigidly interconnected with said first structural member;

a second hinge member rigidly interconnected with said second structural member and further movably interconnected with said first hinge member, wherein said first hinge member pivots relative said second hinge member about said hinge axis;

a first bearing means interposed between said first and second hinge members and having an annular bearing surface extending in a first direction, wherein said first bearing means comprises a tapered roller bearing assembly having a plurality of tapered rollers disposed about and radially spaced relative to said hinge axis at an acute angle relative thereto;

a second bearing means interposed between said first and second hinge members and having an annular bearing surface extending in a second direction, said second direction being transverse to said first direction, wherein said second bearing means comprises a needle roller thrust bearing assembly having a plurality of needle rollers which are disposed about and radially spaced relative to said hinge axis.

34. A hinge assembly, comprising:

a hinge axis;

a first hinge member;

a second hinge member movably interconnected with said first hinge member, wherein said first hinge member pivots relative said second hinge member about said hinge axis;

a first bearing disposed about said first hinge axis and between said first and second hinge members at a first location, said first bearing comprising a first bearing surface which is disposed in a first orientation relative to said first hinge axis, wherein said first bearing principally takes a first load;

a second bearing disposed about said first hinge axis and between said first and second hinge members at a second location which is different from said first location, said second bearing comprising a second bearing surface which is disposed in a second orientation relative to said first hinge axis which is different from said first orientation, wherein said first bearing principally takes a second load which is different from said first load.

* * * * *

UNITED STATES PATENT AND TRADEMARK OFFICE
CERTIFICATE OF CORRECTION

PATENT NO. : 6,038,736
DATED : March 21, 2000
INVENTOR(S): William D. Nygren

It is certified that error appears in the above-identified patent and that said Letters Patent is hereby corrected as shown below:

At Column 11, line 27, after the word "location," insert the word --wherein--.

Signed and Sealed this

Sixth Day of February, 2001

Attest:

Q. TODD DICKINSON

*Attesting Officer*     *Director of Patents and Trademarks*